United States Patent
Lasser

(10) Patent No.: US 10,191,899 B2
(45) Date of Patent: Jan. 29, 2019

(54) SYSTEM AND METHOD FOR UNDERSTANDING TEXT USING A TRANSLATION OF THE TEXT

(71) Applicant: COMIGO LTD., Yarkona (IL)

(72) Inventor: Menahem Lasser, Kohav-Yair (IL)

(73) Assignee: Comigo Ltd., Yarkona (IL)

(*) Notice: Subject to any disclaimer, the term of this patent is extended or adjusted under 35 U.S.C. 154(b) by 10 days.

(21) Appl. No.: 15/415,952

(22) Filed: Jan. 26, 2017

(65) Prior Publication Data

US 2017/0351661 A1   Dec. 7, 2017

Related U.S. Application Data

(60) Provisional application No. 62/345,989, filed on Jun. 6, 2016.

(51) Int. Cl.
G06F 17/28 (2006.01)
G06F 17/27 (2006.01)

(52) U.S. Cl.
CPC ...... *G06F 17/2785* (2013.01); *G06F 17/2836* (2013.01); *G06F 17/2854* (2013.01); *G06F 17/2775* (2013.01); *G06F 17/2863* (2013.01)

(58) Field of Classification Search
CPC .. G06F 17/28; G06F 17/2809; G06F 17/2818; G06F 17/2827; G06F 17/2836; G06F 17/2845; G06F 17/2854; G06F 17/2863; G06F 17/2872; G06F 17/289; G06F 17/2881; G06F 17/30265
USPC ........................................................ 704/2–8
See application file for complete search history.

(56) References Cited

U.S. PATENT DOCUMENTS

| | | | |
|---|---|---|---|
| 4,931,935 A | 6/1990 | Ohira et al. | |
| 4,980,829 A | 12/1990 | Okajima et al. | |
| 5,056,021 A | 10/1991 | Ausborn | |
| 5,109,509 A | 4/1992 | Katayama et al. | |
| 5,424,947 A | 6/1995 | Nagao et al. | |
| 5,590,039 A | 12/1996 | Ikeda et al. | |
| 5,761,631 A | 6/1998 | Nasukawa | |
| 5,794,050 A | 8/1998 | Dahlgren et al. | |
| 5,878,386 A | 3/1999 | Coughlin | |
| 6,292,771 B1 | 9/2001 | Haug et al. | |
| 6,463,404 B1 * | 10/2002 | Appleby | G06F 17/2785 704/2 |
| 6,505,157 B1 | 1/2003 | Elworthy | |
| 6,684,201 B1 | 1/2004 | Brill | |
| 6,760,695 B1 * | 7/2004 | Kuno | G06F 17/271 704/2 |
| 6,901,360 B1 * | 5/2005 | Dymetman | G06F 17/271 704/2 |

(Continued)

FOREIGN PATENT DOCUMENTS

WO    03058490 A1    7/2003

OTHER PUBLICATIONS

Puns and double-meanings; clever and funny puns—new, original, classic, corny—amusing, educational, wordplay trivia and curiosities; Businessballs.com 2017; Alan Chapman.

*Primary Examiner* — Lamont M Spooner
(74) *Attorney, Agent, or Firm* — Marc Van Dyke; Fourth Dimension IP

(57) ABSTRACT

Devices and methods for determining the content of a first segment of text in a first language, using a second segment of text in a second language. The second segment of text is a translation of the first segment of text.

20 Claims, 6 Drawing Sheets

(56) References Cited

U.S. PATENT DOCUMENTS

| | | |
|---|---|---|
| 6,952,666 B1 | 10/2005 | Weise |
| 7,739,102 B2 | 6/2010 | Bender |
| 8,209,165 B2 | 6/2012 | Whitelock et al. |
| 8,463,593 B2 | 6/2013 | Pell et al. |
| 8,712,759 B2* | 4/2014 | Ylonen ............... G06F 17/2785 704/257 |
| 9,298,701 B2 | 3/2016 | Fuji et al. |
| 9,552,354 B1* | 1/2017 | Seligman ............ G06F 17/2755 |
| 2001/0014902 A1 | 8/2001 | Hu et al. |
| 2001/0024902 A1 | 9/2001 | Hirokawa |
| 2004/0078190 A1 | 4/2004 | Fass et al. |
| 2004/0254783 A1 | 12/2004 | Isahara |
| 2005/0080613 A1 | 4/2005 | Colledge et al. |
| 2005/0137855 A1* | 6/2005 | Maxwell, III ....... G06F 17/2881 704/9 |
| 2006/0224378 A1* | 10/2006 | Chino ................. G06F 17/2785 704/2 |
| 2006/0271350 A1* | 11/2006 | Chino ................. G06F 17/2755 704/2 |
| 2007/0118351 A1* | 5/2007 | Sumita ............... G06F 17/2827 704/2 |
| 2007/0214489 A1* | 9/2007 | Kwong ................ G06F 17/289 725/135 |
| 2007/0250494 A1* | 10/2007 | Peoples ............. G06F 17/30669 |
| 2008/0221868 A1* | 9/2008 | Melnick ............... G06F 17/241 704/8 |
| 2008/0306727 A1* | 12/2008 | Thurmair ............ G06F 17/2818 704/4 |
| 2009/0006350 A1* | 1/2009 | Narahara ............. G11B 27/105 |
| 2010/0076943 A1 | 3/2010 | Chen et al. |
| 2010/0198579 A1* | 8/2010 | Cunnington .......... G06F 17/289 704/3 |
| 2011/0320466 A1* | 12/2011 | Broshi ............. G06F 17/30867 707/754 |
| 2012/0265518 A1* | 10/2012 | Lauder ................ G06F 17/2854 704/3 |
| 2013/0007057 A1* | 1/2013 | Li ..................... G06F 17/30265 707/769 |
| 2013/0060559 A1* | 3/2013 | Ryu ...................... G06F 17/289 704/3 |
| 2013/0138421 A1 | 5/2013 | Moulder |
| 2013/0253901 A1* | 9/2013 | Krack .................. G06F 17/289 704/2 |
| 2017/0318335 A1* | 11/2017 | Ding .................... H04N 21/435 |

* cited by examiner

SYSTEM AND METHOD FOR UNDERSTANDING TEXT USING A TRANSLATION OF THE TEXT

RELATED APPLICATION

The present application gains priority from U.S. Provisional Patent Application 62/345,989 filed Jun. 6, 2016 and entitled "Understanding Text Using a Translation in another Language", which is incorporated herein by reference as if fully set forth herein.

FIELD AND BACKGROUND OF THE INVENTION

The invention, in some embodiments, relates to understanding of the meaning of a written text, and more particularly to methods and systems which enable understanding of a text in a first language using a translation of the text into a second language.

The problem of understanding text by computers is well known. For example, full understanding of an input text is required in order for a computer to automatically generate an output text in another language, such that the output text has the exact same meaning as the input text, in a process known as "machine translation". Another use for automatic understanding of a written text is the extraction of knowledge from the text, for example for generating recommendations of content to a TV subscriber based on textual summaries provided by content providers, which requires full understanding of the input text in order correctly judge what content is expected to be of interest to the subscriber.

A naïve approach to the task of understanding text would be to lookup each word of the text in a dictionary. Unfortunately, this approach often results in an inaccurate translation, as it disregards the existence of ambiguous words, which have multiple distinct meanings. For example the word "numbered" has multiple meanings, including, (i) marked by a number, as in "The pages of this book are numbered", and (ii) limited in number, as in "The old man's days are numbered". In some cases, the context of the full sentence in which the ambiguous word appears may indicate which of the multiple interpretations, or meanings, of the ambiguous word, is the correct one for understanding the text. However, there are cases in which it is impossible to determine, based on the context, which of two meanings is the correct one. For example, in the sentence "The days of the paper calendar are numbered" it is impossible to tell whether the meaning is that the day of the paper calendar are marked by numbers, or that the days of the paper calendar are limited in number.

Additional examples of ambiguous English sentences, containing words having multiple meanings, which cannot be resolved from their local context, include: "Being in debt attracts a lot of interest from bankers", "The invention of the wheel created a revolution", and "Airlines process lost luggage on a case by case basis". (All the above ambiguous sentences are taken from http://www.businessballs.com/puns-double-meanings.htm).

The problem of ambiguous words with multiple meanings is well known and many solutions for it have been proposed. Many of the proposed solutions rely on a statistical approach, in which a large amount of text is analyzed, in advance, to determine relative frequencies of each of the potential meanings of each ambiguous word by counting occurrences of these meanings and storing the counts in a database. Subsequently, when encountering the ambiguous word in a text to be understood, it is assumed that the meaning of the word is the most frequently appearing meaning according to the advanced analysis, thus providing a high probability of selecting the correct meaning of the ambiguous word.

An improvement to the statistical approach described above, which adds context analysis to the statistical approach, is disclosed in http://anthology.aclweb.org/P/P91/P91-1017.pdf. In accordance with this method, rather than counting occurrences of single words, the improved method counts occurrences of pairs of words that appear to be related to each other in the analyzed text, and then selects the most frequent interpretation for the pair of words. In the example provided above, of "The days of the paper calendar are numbered", one may count occurrences of the pair {days/numbered} in which the word "numbered" is used with the meaning of "marked by a number" and in which the word "numbered" is used with the meaning of "limited in number". Most probably we will determine that when combined with the word "days", the word "numbered" is more frequently used to mean "limited in number" rather than "marked by number", and therefore the interpretation "limited in number" would be selected.

An additional improvement disclosed in the article mentioned above is to apply the statistical test, not (only) in the language of the analyzed text, but (also) in a second language in which the analyzed word is not ambiguous, and has a single meaning. For example, even though the word "numbered" is ambiguous in English and corresponds to two different meanings, in Hebrew those two meanings are each associated with a different word: "ממוספרים" (pronounced meh-moos-pah-REEM) for "marked by number" and "ספורים" (pronounced sfoo-REEM) for "limited in number". In accordance with this improved method, the occurrences of each of the two Hebrew words (or pairs of words) are counted over a large amount of Hebrew text, and it is assumed that the resulting probabilities measured on the Hebrew text are reliable approximations of the corresponding probabilities of the multiple meanings of the ambiguous word in English. The authors of the article claim that counting the likelihood of a word meaning, or of the meaning of a pair of words, in a different language may provide better results than counting the likelihood of a corresponding word meaning in the language of the original text.

However, all the described solutions for determining the meaning of an ambiguous word, succeed in increasing the likelihood of achieving the correct interpretation of the word, but are far from providing 100% accurate understanding of the text. Additionally, the more successful the solution, the more complex, time consuming, and expensive it is to implement. Methods that rely on statistics of pairs of words require a much more extensive analysis of a large amount of reference text and a much higher number of entries for which occurrence data must be stored.

There is therefore a need in the art for a method for determining the meaning of a text including ambiguous words at a high accuracy rate, while being simple, robust, fast, and inexpensive to implement.

SUMMARY OF THE INVENTION

Some embodiments of the invention relate to methods and systems for understanding the meaning of a written text, and specifically to methods and systems that enable understanding of a text in a first language using a translation of the text into a second language.

According to an aspect of some embodiments of the invention, there is provided a method for determining content of a text associated with video media content and for generating an output based on the content, the method including:
  a. obtaining, by a processor associated with a media playing device or with a set top box feeding the media playing device, a first segment of text in a first language, the first segment of text being part of subtitles in the first language of video media content played by the media playing device;
  b. obtaining, by the processor, a second segment of text in a second language, the second segment of text being part of subtitles in the second language of the video media content played by the media playing device, the second segment of text being a translation of the first segment of text;
  c. using the processor, determining the content of the first segment of text, in accordance with a predefined analysis rule, the determining of the content of the first segment of text being done while the media playing device is playing the video media content, the rule including:
    i. attempting to determine content of the first segment of text by analyzing the first segment of text without using the second segment of text;
    ii. during the analyzing of the first segment of text, identifying one or more ambiguous words in the first segment of text which have multiple meanings in the first language;
    iii. for at least one identified ambiguous word having multiple meanings in the first language:
      A. identifying a corresponding word of the second language that appears in the second segment of text and is a translation of the identified ambiguous word, the corresponding word having an unambiguous meaning in the second language; and
      B. assigning the unambiguous meaning of the corresponding word to the identified ambiguous word; and
  d. outputting, by the processor, a recommendation based on the determined content of the first segment of text, the recommendation being for content associated with the video media content or with the first segment of text.

In some embodiments, outputting a recommendation includes outputting the recommendation as a textual recommendation.

In some embodiments, outputting a recommendation includes displaying the recommendation visually on a display of the media playing device.

In some embodiments, if the corresponding word in the second language is an ambiguous word having multiple meanings in the second language, the method further includes repeating step (iii) with respect to a third segment of text in a third language, the third segment of text being part of subtitles of the video media content played by the media playing device, the third segment of text being a translation of the first segment of text.

In some embodiments, identifying ambiguous words includes looking up words of the first segment of text in a pre-compiled list of ambiguous words for the first language.

According to another aspect of some embodiments of the invention, there is provided a method for determining content of a text and for generating an output based on the content, the method including:
  a. obtaining, by a processor associated with a device operable to analyze text for determining content of the text, a first segment of text in a first language;
  b. obtaining, by the processor, a second segment of text in a second language, the second segment of text being a translation of the first segment of text;
  c. using the processor, determining the content of the first segment of text, in accordance with a predefined analysis rule, the rule including:
    i. attempting to determine content of the first segment of text by analyzing the first segment of text without using the second segment of text;
    ii. during the analyzing of the first segment of text, identifying one or more ambiguous words in the first segment of text which have multiple meanings in the first language;
    iii. for at least one identified ambiguous word having multiple meanings in the first language:
      A. identifying a corresponding word of the second language that appears in the second segment of text and is a translation of the identified ambiguous word, the corresponding word having an unambiguous meaning in the second language; and
      B. assigning the unambiguous meaning of the corresponding word to the identified ambiguous word; and
  d. outputting, by the processor, a message based on the content of the first segment of text.

In some embodiments, outputting a message includes outputting a textual description of the content of the first segment of text.

In some embodiments, outputting a message includes obtaining information that is related to the content of the first segment of text and outputting the information.

In some embodiments, outputting a message includes generating a translation of the first segment of text into a third segment of text in a third language, and outputting the third segment of text as the message.

In some embodiments, the first segment of text and the second segment of text are obtained from subtitles of video media content while the video media content is being played by a media playing device, and wherein the outputting a message includes generating a recommendation for content associated with the video media content or with the first segment of text, and outputting the recommendation as the message.

In some embodiments, outputting a message includes displaying the message visually on a display device functionally associated with the processor.

In some embodiments, outputting a message includes outputting the message to a non-transitory computer readable storage medium functionally associated with the processor.

In some embodiments, if the corresponding word in the second language is an ambiguous word having multiple meanings in the second language, the method further includes repeating step (iii) with respect to a third segment of text in a third language, the third segment of text being a translation of the first segment of text.

In some embodiments, identifying ambiguous words includes looking up words of the first segment of text in a pre-compiled list of ambiguous words for the first language.

According to yet another aspect of some embodiments of the invention, there is provided a method for determining content of a text associated with video media content and for generating an output based on the content, the method including:
  a. obtaining, by a processor associated with a media playing device or with a set top box feeding the media playing device, a first segment of text in a first language, the first segment of text being part of subtitles in the first language of video media content played by the media playing device;
  b. obtaining, by the processor, a second segment of text in a second language, the second segment of text being part of subtitles in the second language of the video media content played by the media playing device, the second segment of text being a translation of the first segment of text;
  c. using the processor, determining the content of the first segment of text, in accordance with a predefined analysis rule, the determining of the content of the first segment of text being done while the media playing device is playing the video media content, the rule including:
    i. attempting to determine the content of the first segment of text by analyzing the first segment of text without using the second segment of text;
    ii. only if the analyzing of the first segment of text fails to determine the content of the first segment of text:
      A. analyzing the second segment of text for determining the content of the second segment of text; and
      B. using results of the analyzing of the second segment of text to determine the content of the first segment of text; and
  d. outputting, by the processor, a recommendation based on the determined content of the first segment of text, the recommendation being for content associated with the video media content or with the first segment of text.

In some embodiments, outputting a recommendation includes outputting the recommendation as a textual recommendation.

In some embodiments, outputting a recommendation includes displaying the recommendation visually on a display of the media playing device.

According to a further aspect of some embodiments of the invention, there is provided a method for determining content of a text and for generating an output based on the content, the method including:
  a. obtaining, by a processor associated with a device operable to analyze text for determining content of the text, a first segment of text in a first language;
  b. obtaining, by the processor, a second segment of text in a second language, the second segment of text being a translation of the first segment of text;
  c. using the processor, determining the content of the first segment of text, in accordance with a predefined analysis rule, the rule including:
    i. attempting to determine the content of the first segment of text by analyzing the first segment of text without using the second segment of text; and
    ii. only if the analyzing of the first segment of text fails to determine the content of the first segment of text:
      A. analyzing the second segment of text for determining the content of the second segment of text; and
      B. using results of the analyzing of the second segment of text to determine the content of the first segment of text; and
  d. outputting, by the processor, a message based on the determined content of the first segment of text.

In some embodiments, outputting a message includes outputting a textual description of the content of the first segment of text.

In some embodiments, outputting a message includes obtaining information that is related to the content of the first segment of text and outputting the information.

In some embodiments, outputting a message includes generating a translation of the first segment of text into a third segment of text in a third language, and outputting the third segment of text as the message.

In some embodiments, the first segment of text and the second segment of text are obtained from subtitles of video media content while the video media content is being played by a media playing device, and wherein the outputting a message includes generating a recommendation for content associated with the video media content or with the first segment of text, and outputting the recommendation as the message.

In some embodiments, outputting a message includes displaying the message visually on a display device functionally associated with the processor.

In some embodiments, outputting a message includes outputting the message to a non-transitory computer readable storage medium functionally associated with the processor.

According to another aspect of some embodiments of the invention, there is provided a device for determining content of a text associated with video media content and for generating an output based on the content, the device including:
  a. a processor associated with a media playing device or with a set top box feeding the media playing device; and
  b. a non-transitory computer readable storage medium for instructions execution by the processor, the non-transitory computer readable storage medium having stored:
    i. instructions to obtain a first segment of text in a first language, the first segment of text being part of subtitles in the first language of video media content played by the media playing device;
    ii. instructions to obtain a second segment of text in a second language, the second segment of text being part of subtitles in the second language of the video media content played by the media playing device, the second segment of text being a translation of the first segment of text;
    iii. instructions to determine the content of the first segment of text, in accordance with a predefined analysis rule, while the media playing device is playing the video media content, the rule implemented by instructions including:
      A. instructions to attempt to determine content of the first segment of text by analyzing the first segment of text without using the second segment of text;
      B. instructions to identify, during the analyzing of the first segment of text, one or more ambiguous words in the first segment of text which have multiple meanings in the first language; and
      C. instructions to be carried out for at least one identified ambiguous word having multiple meanings in the first language, including:
        I. instructions to identify a corresponding word of the second language that appears in the second segment of text and is a translation of the identified ambiguous word, the corresponding word having an unambiguous meaning in the second language; and II. instructions to assign the unambiguous meaning of the corresponding word to the identified ambiguous word; and iv. instructions to output a recommendation based on the determined content of the first segment of text, the recommendation being for content associated with the video media content or with the first segment of text.

In some embodiments, the instructions to output a recommendation include instructions to output the recommendation as a textual recommendation.

In some embodiments, the instructions to output a recommendation include instructions to display the recommendation visually on a display of the media playing device.

In some embodiments, the non-transitory computer readable medium further has stored instructions to repeat the instructions of (C) with respect to a third segment of text in a third language if the corresponding word in the second language is an ambiguous word having multiple meanings in the second language, the third segment of text being part of subtitles of the video media content played by the media playing device, the third segment of text being a translation of the first segment of text.

In some embodiments, the instructions to identify ambiguous words include instructions to look up words of the first segment of text in a pre-compiled list of ambiguous words for the first language.

According to a further aspect of some embodiments of the invention, there is provided a device for determining content of a text and for generating an output based on the content, the device including:

a. a processor associated with a device operable to analyze text for determining content of the text; and
b. a non-transitory computer readable storage medium for instructions execution by the processor, the non-transitory computer readable storage medium having stored:
  i. instructions to obtain a first segment of text in a first language;
  ii. instructions to obtain a second segment of text in a second language, the second segment of text being a translation of the first segment of text;
  iii. instructions to determine the content of the first segment of text, in accordance with a predefined analysis rule, the rule implemented by instructions including:
    A. instructions to attempt to determine content of the first segment of text by analyzing the first segment of text without using the second segment of text;
    B. instructions to identify, during the analyzing of the first segment of text, one or more ambiguous words in the first segment of text which have multiple meanings in the first language; and
    C. instructions to be carried out for at least one identified ambiguous word having multiple meanings in the first language, including:
      I. instructions to identify a corresponding word of the second language that appears in the second segment of text and is a translation of the identified ambiguous word, the corresponding word having an unambiguous meaning in the second language; and
      II. instructions to assign the unambiguous meaning of the corresponding word to the identified ambiguous word; and
  iv. instructions to output a message based on the determined content of the first segment of text.

In some embodiments, the instructions to output a message include instructions to output a textual description of the content of the first segment of text.

In some embodiments, the instructions to output a message include instructions to obtain information that is related to the content of the first segment of text and instructions to output the information.

In some embodiments, the instructions to output a message include instructions to generate a translation of the first segment of text into a third segment of text in a third language, and instructions to output the third segment of text as the message.

In some embodiments, the instructions to obtain the first segment of text and the instructions to obtain the second segment of text include instructions to obtain the first and second segments of text from subtitles of video media content while the video media content is being played by a media playing device, and the instructions to output a message include instructions to generate a recommendation for content associated with the video media content or with the first segment of text, and instructions to output the recommendation as the message.

In some embodiments, the instructions to output a message include instructions to display the message visually on a display device functionally associated with the processor.

In some embodiments, the instructions to output a message include instructions to output the message to a non-transitory computer readable storage medium functionally associated with the processor.

In some embodiments, the non-transitory computer readable medium further having stored instructions to repeat the instructions of (C) with respect to a third segment of text in a third language if the corresponding word in the second language is an ambiguous word having multiple meanings in the second language, the third segment of text being a translation of the first segment of text.

In some embodiments, the instructions to identify ambiguous words include instructions to look up words of the first segment of text in a pre-compiled list of ambiguous words for the first language.

According to another aspect of some embodiments of the invention, there is provided a device for determining content of a text associated with video media content and for generating an output based on the content, the device including:

a. a processor associated with a media playing device or with a set top box feeding the media playing device; and
b. a non-transitory computer readable storage medium for instructions execution by the processor, the non-transitory computer readable storage medium having stored:
  i. instructions to obtain a first segment of text in a first language, the first segment of text being part of subtitles in the first language of video media content played by the media playing device;
  ii. instructions to obtain a second segment of text in a second language, the second segment of text being part of subtitles in the second language of the video media content played by the media playing device, the second segment of text being a translation of the first segment of text;

iii. instructions to determine the content of the first segment of text, in accordance with a predefined analysis rule, while the media playing device is playing the video media content, the rule implemented by instructions including:
   A. instructions to attempt to determine the content of the first segment of text by analyzing the first segment of text without using the second segment of text; and
   B. instructions to be carried out only if the analyzing of the first segment of text fails to determine the content of the first segment of text, including:
      I. instructions to analyze the second segment of text for determining the content of the second segment of text; and
      II. instructions to use results of the analyzing of the second segment of text to determine the content of the first segment of text; and
iv. instructions to output a recommendation based on the determined content of the first segment of text, the recommendation being for content associated with the video media content or with the first segment of text.

In some embodiments, the instructions to output a recommendation include instructions to output the recommendation as a textual recommendation.

In some embodiments, the instructions to output a recommendation include instructions to display the recommendation visually on a display of the media playing device.

According to a further aspect of some embodiments of the invention, there is provided a device for determining content of a text and for generating an output based on the content, the device including:
a. a processor associated with a device operable to analyze text for determining content of the text; and
b. a non-transitory computer readable storage medium for instructions execution by the processor, the non-transitory computer readable storage medium having stored:
   i. instructions to obtain a first segment of text in a first language;
   ii. instructions to obtain a second segment of text in a second language, the second segment of text being a translation of the first segment of text;
   iii. instructions to determine the content of the first segment of text, in accordance with a predefined analysis rule, the rule implemented by instructions including:
      A. instructions to attempt to determine the content of the first segment of text by analyzing the first segment of text without using the second segment of text; and
      B. instructions to be carried out only if the analyzing of the first segment of text fails to determine the content of the first segment of text, including:
         I. instructions to analyze the second segment of text for determining the content of the second segment of text; and
         II. instructions to use results of the analyzing of the second segment of text to determine the content of the first segment of text; and
   iv. instructions to output a message based on the determined content of the first segment of text.

In some embodiments, the instructions to output a message include instructions to output a textual description of the content of the first segment of text.

In some embodiments, the instructions to output a message include instructions to obtain information that is related to the content of the first segment of text and instructions to output the information.

In some embodiments, the instructions to output a message include instructions to generate a translation of the first segment of text into a third segment of text in a third language, and instructions to output the third segment of text as the message.

In some embodiments, the instructions to obtain the first segment of text and the instructions to obtain the second segment of text include instructions to obtain the first and second segments of text from subtitles of video media content while the video media content is being played by a media playing device, and the instructions to output a message include instructions to generate a recommendation for content associated with the video media content or with the first segment of text, and instructions to output the recommendation as the message.

In some embodiments, the instructions to output a message include instructions to display the message visually on a display device functionally associated with the processor.

In some embodiments, the instructions to output a message include instructions to output the message to a non-transitory computer readable storage medium functionally associated with the processor.

Unless otherwise defined, all technical and scientific terms used herein have the same meaning as commonly understood by one of ordinary skill in the art to which the invention pertains. In case of conflict, the specification, including definitions, will take precedence.

As used herein, the terms "comprising", "including", "having" and grammatical variants thereof are to be taken as specifying the stated features, integers, steps or components but do not preclude the addition of one or more additional features, integers, steps, components or groups thereof. These terms encompass the terms "consisting of" and "consisting essentially of".

BRIEF DESCRIPTION OF THE FIGURES

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are used to designate like elements.

In the drawings.

DESCRIPTION OF SOME EMBODIMENTS OF THE INVENTION

Figure 1A:
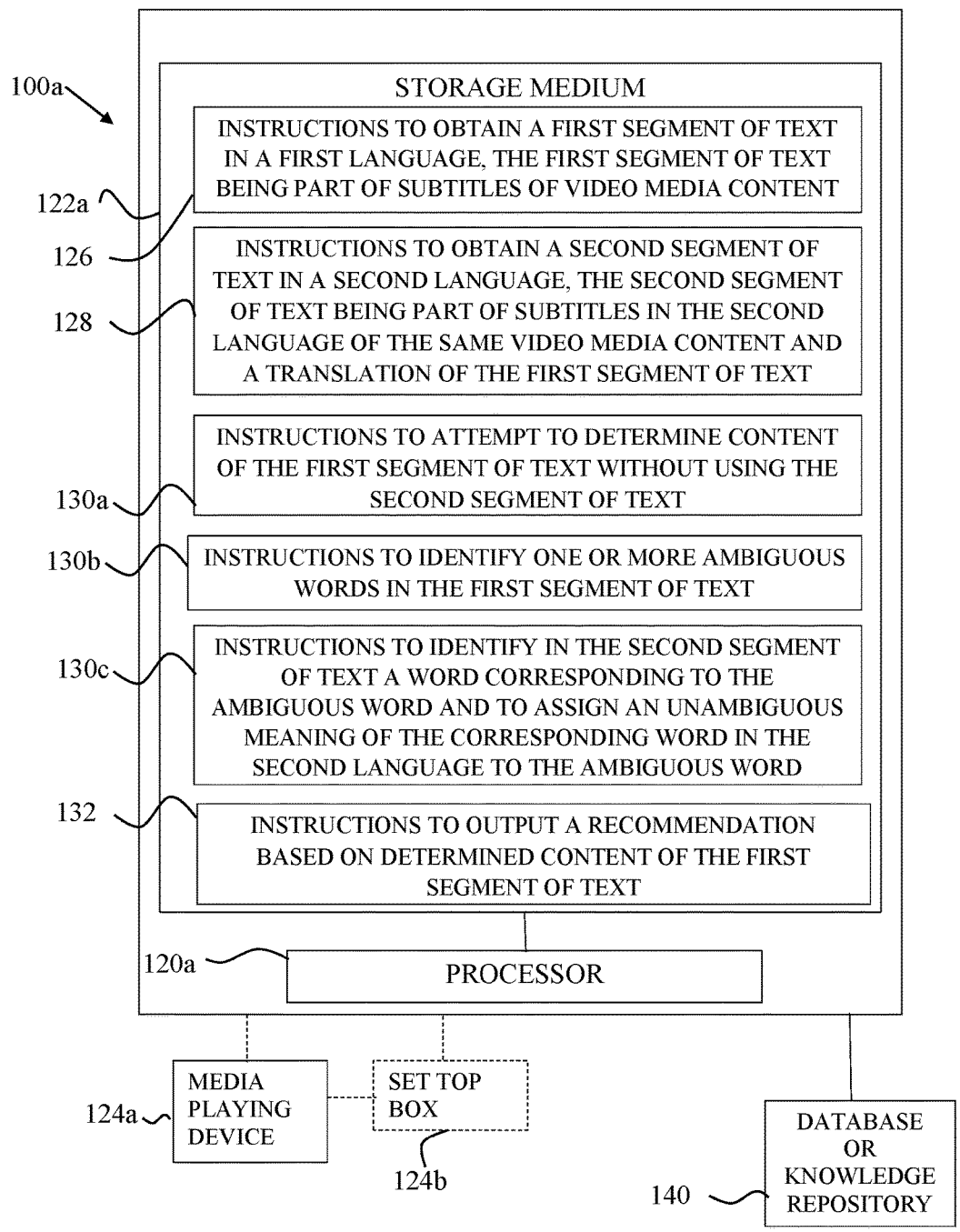
FIGS. 1A and 1B are schematic block diagrams of two embodiments of devices for determining the meaning of a segment of text, using a translation of the text into another language, according to an embodiment of the teachings herein.

The invention, in some embodiments, relates to understanding of the meaning of a written text, and more particularly to methods and systems which enable understanding of a text in a first language using a translation of the text into a second language.

It is a goal of the present invention to understand the meaning of a segment of text, using a translation of the text in a second language to disambiguate ambiguous words having multiple meanings in the language of the original text.

As described hereinabove, there are many approaches for disambiguating the meaning of words in a text when attempting to understand the meaning of the text. The existing approaches typically include advance analysis of a significant volume of text, so as to determine the statistical probability of an ambiguous word to have a specific meaning, whether independently or in context with another word.

However, such prior art methods require significant time, computing, and storage resources for carrying out the advance analysis and for storing the results thereof. Additionally, implementation of such methods is often prohibitively expensive.

By contrast, as will be described in detail hereinbelow, the present invention provides methods and systems for understanding text using translation of the original text into a second language, without requiring any advance analysis or processing of large amounts of text. Additionally, the methods and systems of the present invention do not require storage of statistical databases, and therefore require use of less memory than prior art methodologies. The methods and systems described herein also reduce the processing power required for understanding the text since no advance analysis is required, and since translation can be carried out in real time, as the text is obtained, as described in further detail hereinbelow.

The solution proposed by the present invention is applicable to a sub-class of the general problem of ambiguous words—the case in which the text to be understood is available in multiple languages. For example, this may be the case when extracting knowledge from sub-titles of a movie—typically the movie is provided with pre-prepared sub-titles in two or more languages, making the methods of the proposed solution applicable. Another example is when carrying out machine translation of text in a first language, which text was previously translated, by whatever means, to a second language, in order to generate a translation of the text into a third language.

The availability of a translation of the text to be understood in a second language allows an analysis engine implementing the methods of the present invention to avoid costly offline analysis and large databases, as the correct meaning of an ambiguous word in the first language may be determined with the help of the already known translation to a second language in which that word may be non-ambiguous.

A straight-forward way for taking advantage of the availability of the analyzed text in two different languages is by first independently and separately analyzing the text in each of the two languages, and then combining the two results, or validating one result using the other.

For example, if the analyzed text is available in both English and Hebrew, a full analysis of the text may be carried out once using only the English text as input, and a second time using only the Hebrew text as input. Consequently, each word in the text would have one of (i) a non-ambiguous meaning in both English and Hebrew (which must be the same meaning in both languages if the translation is accurate), (ii) an ambiguous meaning in English and a non-ambiguous meaning in Hebrew, (iii) a non-ambiguous meaning in English and an ambiguous meaning in Hebrew, (iv) an ambiguous meaning in both English and Hebrew. For cases (ii) and (iii) the non-ambiguous meaning of the word is selected from the appropriate language. For case (iv) the attempt to resolve the ambiguity fails, and other means (for example a third language) may be used for resolving the ambiguity.

This method of using two versions of the analyzed text in two different languages for selecting the correct meaning of ambiguous words provides better results than the prior art statistical methods, as it eliminates or reduces the dependency on statistical data which introduces a high degree of uncertainty and error into the selection process.

In some cases, the second language may be used only if the analysis of the text in the first language resulted in ambiguity. As such, if the analysis of the text in the first language resulted in each of the words having a single meaning, there is no need for analysis of the text in the second language.

In such cases, a method for taking advantage of the availability of the analyzed text in two different languages is by using the second language only to understand the meaning of words that were identified as ambiguous when analyzing the text in the first language. This process may include:

a. Preparing in advance a list of all words in a first language that have multiple meanings. The list may be a stand-alone list containing only the ambiguous words of the first language, or it may be a database or a list containing all the words of the first language, with the ambiguous words marked by an "ambiguity flag". Optionally, the list of ambiguous words may contain the corresponding potential translations in a second language.

b. Scanning the text to be analyzed using the version in the first language. For each word in the text, determining whether the word is ambiguous or non-ambiguous in the first language. The determination may be made by looking the word up in the ambiguous words list. Non-ambiguous words are resolved, or understood, without referring to the second language version of the analyzed text, whereas for some or all of the ambiguous words encountered during the scan the second language version of the analyzed text is consulted. If the meaning of the word in the second language which corresponds to the ambiguous word, is non-ambiguous in the second language, i.e. the corresponding word has only one meaning in the second language, that meaning is taken to be the correct meaning of the ambiguous word in the first language as well.

c. If the corresponding word in the second-language text is also ambiguous, another methodology may be used for disambiguating the word, such as, for example, finding a third language version of the text (if available) and analyzing the meaning of the corresponding word in the third language.

The above method is much more efficient and inexpensive to implement than the straight-forward method described before it, as it does not require an analysis of all words in the second language text.

In the context of the present application, the term "segment of text" relates to any portion of text, which may be a single word, multiple words—whether or not comprising a known phrase, a clause, a phrase, a sentence, multiple sentences, a paragraph, or multiple paragraphs. The term "segment of text" does not require or imply that the portion of text corresponding to the segment is a subset of a larger portion of text.

In the context of the present application, the term "content of a segment of text" relates to a full or partial meaning of the segment of text. A "full meaning" of the segment is an understanding of the meaning of the text sufficient for generating a full and accurate translation of the segment of text into a second language. A "partial meaning" of the segment is an understanding of the meaning of the text sufficient for identifying at least one concept or topic appearing in the segment of text, even if the understanding is insufficient for generating a full translation of the segment of text into a second language.

In the context of the present application, the term "outputting" from a device, for example of a message or content, relates to providing the message or content in any suitable way to another entity, such as displaying the message or content on a screen, playing the message or content as audio, sending the message or content to another device via a communication line or a communication network, or storing the message or content into a non-transitory computer readable storage medium.

In the context of the present application, the term "message" relates to any type of information, such as, for example, a recommendation, a translation, an analysis, and the like.

In the context of the present application, the term "video media content" relates to any segment of video of any length and in any format, whether or not the segment of video is associated with a corresponding audio segment.

In the context of the present application, the term "media playing device" relates to any device capable of playing video media content, such as a desktop computer, a laptop computer, a tablet computer, a smartphone, a DVD player, a television, and the like.

In the context of the present application, the terms "subtitles", "captions", and "closed-captions" all relate to text intended to be displayed on a screen of a media playing device during playing of video media content to provide additional or interpretive information. This includes transcription of the audio associated with the video media content as it occurs, description of non-speech elements in the audio, and translation of the audio from a primary language into one or more alternative languages. The text of the subtitles, captions, or closed captions may be visible or invisible when the video media content with which they are associated is being played on the media playing device.

In the context of the present application, the term "ambiguous word" relates to a word having multiple distinct meanings, or interpretations, in a specific language. The translation of an ambiguous word in a first language to a second language may continue to be ambiguous, or may resolve the ambiguity.

The principles, uses and implementations of the teachings herein may be better understood with reference to the accompanying description and figures. Upon perusal of the description and figures present herein, one skilled in the art is able to implement the invention without undue effort or experimentation.

Before explaining at least one embodiment of the invention in detail, it is to be understood that the invention is not limited in its applications to the details of construction and the arrangement of the components and/or methods set forth in the following description and/or illustrated in the drawings and/or the Examples. The invention can be implemented with other embodiments and can be practiced or carried out in various ways. It is also understood that the phraseology and terminology employed herein is for descriptive purpose and should not be regarded as limiting.

Figure 1B:
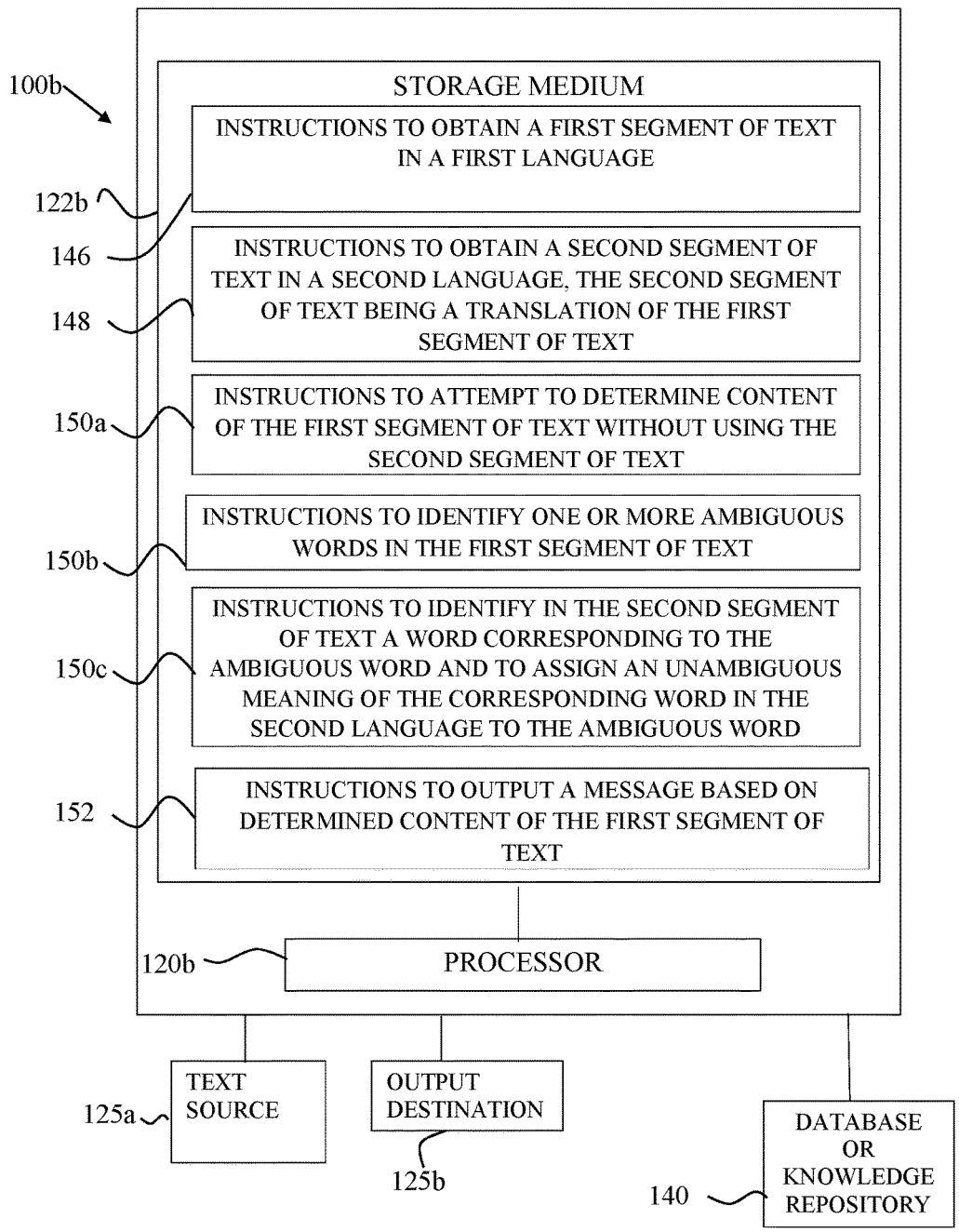

Reference is now made to FIGS. 1A and 1B, which are schematic block diagrams of two embodiments of devices for determining the meaning of a segment of text, using a translation of the text into another language, according to an embodiment of the teachings herein.

As seen in FIG. 1A, a device 100a for determining the meaning of a segment of text includes a processor 120a and a storage medium 122a, which is typically a non-transitory computer readable storage medium. Device 100a further includes, or is associated with, a media playing device 124a and/or a set-top-box 124b, which may itself be associated with the media playing device 124a. As such, device 100a is associated with media playing device 124a either directly, or via set-top-box 124b.

The storage medium 122a includes instructions to be executed by the processor 120a, in order to carry out various steps of the method described herein, as described in further detail hereinbelow. Specifically, the storage medium includes at least the following instructions:

instructions 126 to obtain a first segment of text in a first language, the first segment of text being part of subtitles of video media content played by media playing device 124a;

instructions 128 to obtain a second segment of text in a second language, the second segment of text being part of subtitles in the second language of the same video media content played by media playing device 124a and being a translation of the first segment of text;

instructions to determine content of the first segment of text in accordance with a predefined analysis rule, while the media playing device is playing the video media content, where the rule is implemented by instructions including:

instructions 130a to attempt to determine content of the first segment of text by analyzing the first segment of text without using the second segment of text;

instructions 130b to identify, during the analysis of instructions 130a, one or more ambiguous words in the first segment of text which have multiple meanings in the first language; and instructions 130c to be carried out for at least one identified ambiguous word, and in some embodiments for all identified ambiguous words, to identify a corresponding word in the second language that is a translation of the identified ambiguous word, and that is not ambiguous in the second language (has only one meaning in the second language), and to assign the unambiguous meaning of the corresponding word in the second language to the identified ambiguous word; and instructions 132 to output a recommendation based on the determined content of the first segment of text, the recommendation being for content associated with the video media content or with the first segment of text.

The instructions 130a to attempt to determine content of the first segment of text by analyzing the first segment of text may include instructions for implementing any suitable methodology for natural language processing and understanding of text. For example, the instructions 130a may include instructions for carrying out the methodologies disclosed in U.S. Pat. Nos. 4,931,935; 4,980,829; 5,056,021; 5,109,509; 5,424,947; 5,590,039; 5,761,631; 5,794,050; 5,878,386; 6,292,771; 6,505,157; 6,684,201; 6,952,666; 7,739,102; 8,463,593; 8,712,759; 2001/0024902; 2004/0078190; and 2005/0080613, as well as in http://anthology.aclweb.org/P/P91/P91-1017.pdf, http://citeseerx.ist.psu.edu/viewdoc/download?doi=10.1.1.965.7393&rep=rep1&type=pdf, and "Speech and Language Processing" by Daniel Jurafsky and James H. Martin, all of which are incorporated herein by reference as if fully set forth herein. In some embodiments, the instructions 130a include instructions for accessing a database or knowledge repository 140, which may be functionally associated with processor 120a, for example via a communication system or a communication line.

Turning to FIG. 1B, it is seen that a device 100b thereof is substantially similar to device 100a of FIG. 1A, with slight differences as described herein. As such, the reference numerals of FIG. 1B correspond to those of FIG. 1A.

Device 100b includes a processor 120b substantially as described hereinabove with respect to FIG. 1A. The processor 120b of FIG. 1B is associated with a text source 125a, and with an output destination 125b.

In some embodiments, the text source 125a may be a media playing device or a set top box as described hereinabove with reference to FIG. 1A. In other embodiments the text source may be a website, an electronic book, a local computer or any other suitable text source.

In some embodiments, the output destination 125b is a display screen, such as a display screen associated with a desktop computer, laptop computer, tablet computer, smartphone, or television. In some embodiments, the output destination 125b may be a computer storage, such as a hard disk, a solid-state drive, a removable storage device or the like.

Some of the instructions stored in the storage medium 122b are different from those stored in storage medium 122a. Specifically, the storage medium includes at least the following instructions:

instructions 146 to obtain a first segment of text in a first language;

instructions 148 to obtain a second segment of text in a second language, the second segment of text being a translation of the first segment of text;

instructions to determine content of the first segment of text in accordance with a predefined analysis rule, where the rule is implemented by instructions including:

instructions 150a to attempt to determine content of the first segment of text by analyzing the first segment of text without using the second segment of text;

instructions 150b to identify, during the analysis of instructions 150a, one or more ambiguous words in the first segment of text which have multiple meanings in the first language; and instructions 150c to be carried out for at least one identified ambiguous word, and in some embodiments for all identified ambiguous words, to identify a corresponding word in the second language that is a translation of the identified ambiguous word, and that is not ambiguous in the second language (has only one meaning in the second language), and to assign the unambiguous meaning of the corresponding word in the second language to the identified ambiguous word; and instructions 152 to output a message based on the determined content of the first segment of text.

As discussed hereinabove with reference to FIG. 1A, the instructions 150a may include instructions for carrying out the methodologies disclosed in U.S. Pat. Nos. 4,931,935; 4,980,829; 5,056,021; 5,109,509; 5,424,947; 5,590,039; 5,761,631; 5,794,050; 5,878,386; 6,292,771; 6,505,157; 6,684,201; 6,952,666; 7,739,102; 8,463,593; 8,712,759; 2001/0024902; 2004/0078190; and 2005/0080613, as well as in http://anthology.aclweb.org/P/P91/P91-1017.pdf, http://citeseerx.ist.psu.edu/viewdoc/download?doi=10.1.1.965.7393&rep=rep1&type=pdf, and "Speech and Language Processing" by Daniel Jurafsky and James H. Martin. In some embodiments, the instructions 150a include instructions for accessing a database or knowledge repository 140, which may be functionally associated with processor 120b, for example via a communication system or a communication line.

Figure 2:
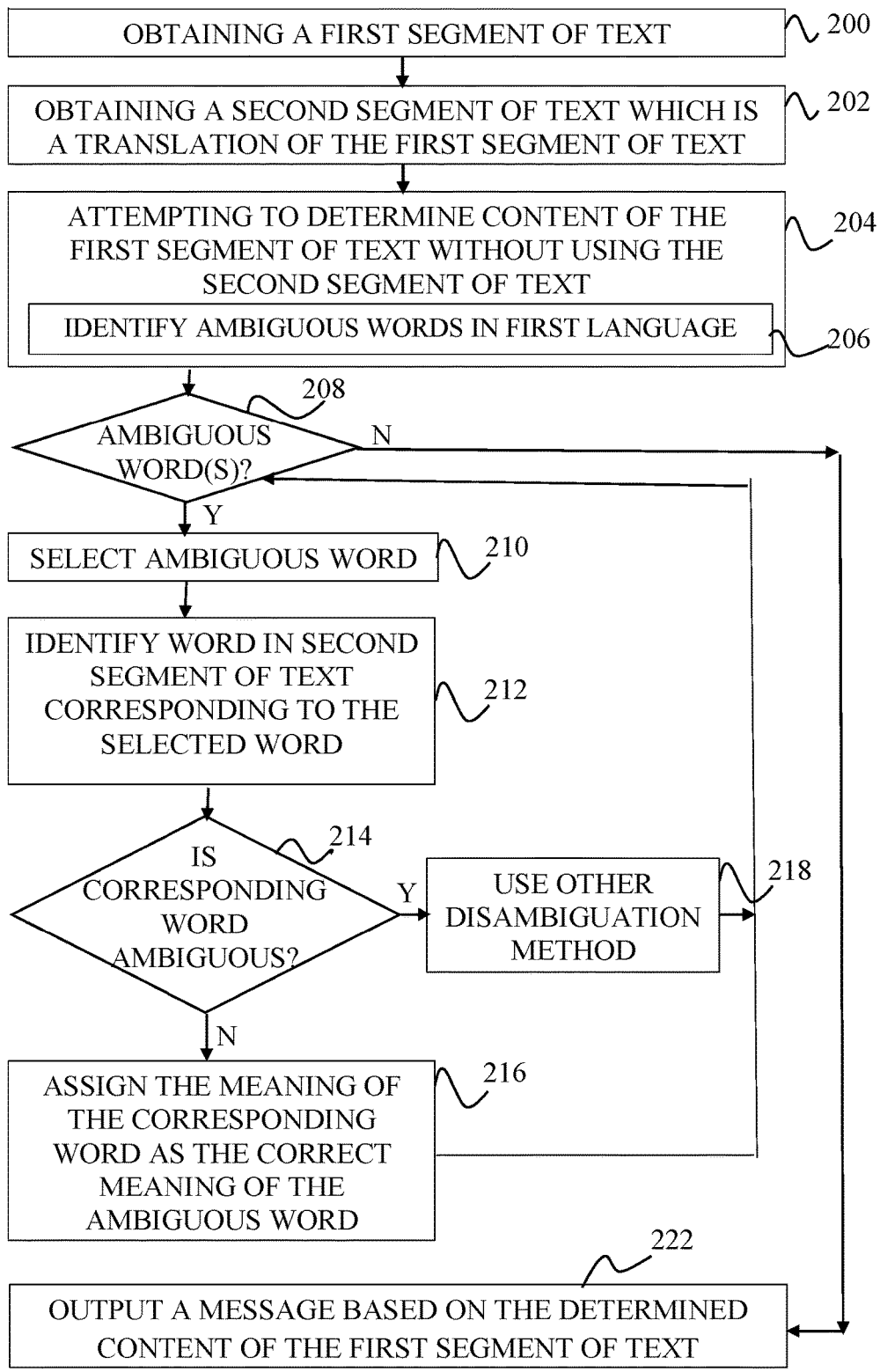
FIG. 2 is a flow chart of an embodiment of a method for determining the meaning of a segment of text, using a translation of the text into another language, according to an embodiment of the teachings herein, using the devices of FIGS. 1A and 1B.

Reference is now additionally made to FIG. 2, which is a flow chart of an embodiment of a method for determining the meaning of a segment of text, using a translation of the text into another language, according to an embodiment of the teachings herein, using the devices 100a and 100b of FIGS. 1A and 1B, respectively.

For the sake of example, the method of FIG. 2 will be described with respect to the example mentioned hereinabove, in which the segment of text is the sentence "the days of the paper calendar are numbered", and the intended meaning is that each page in the paper calendar has a number printed on it.

As seen in FIG. 2, initially the processor (120a or 120b) obtains a first segment of text in a first language, at step 200, and a second segment of text in a second language, at step 202. The second segment of text is a translation of the first segment of text. In the present example, the first segment of text is the English sentence "the days of the paper calendar are numbered" and the second segment of text is the corresponding Hebrew sentence "ביומן הנייר ממוספרים הימים".

In some embodiments, such as when using device 100a of FIG. 1A, the first and second segments of text comprise part of subtitles of video media content played by media playing device 124a. In some such embodiments, the first and second segments of text are obtained from the media playing device 124a or from the set-top box 124b.

In other embodiments, such as when using device 100b of FIG. 1B, the first and second segments of text may be any suitable segments of text, and may include segments taken from a website, a book, a newspaper, a magazine, or from any other suitable source of text. In some such embodiments, the first and second segments of text are obtained from the text source 125a, either directly or via a communication line or a communication network.

The processor (120a or 120b) proceeds to analyze the text in accordance with an analysis rule, as described hereinbelow. It is a particular feature of some embodiments of the teachings herein that analysis of the text is carried out in real-time. For example, in embodiments in which the segment of text comprises subtitles of video media content, the analysis of the text is carried out as the video media content is being played on media playing device 124a. In other embodiments, the analysis of the text may be carried out as the segment of text is being obtained, for example as an electronic book is being read.

At step 204, the processor (120a or 120b) attempts to determine the content of the first segment of text, by analyzing the first segment of text without using the second segment of text. During the analysis of step 204, one or more ambiguous words in the first segment of text, which have more than one meaning in the first language, may be identified by the processor, as seen at step 206.

Analysis of the first segment of text may be carried out using any suitable methodology. For example, analysis of the first segment of text may be carried out using methodologies disclosed in U.S. Pat. Nos. 4,931,935; 4,980,829; 5,056,021; 5,109,509; 5,424,947; 5,590,039; 5,761,631; 5,794,050; 5,878,386; 6,292,771; 6,505,157; 6,684,201; 6,952,666; 7,739,102; 8,463,593; 8,712,759; 2001/0024902; 2004/0078190; and 2005/0080613, as well as in http://anthology.aclweb.org/P/P91/P91-1017.pdf, http://citeseerx.ist.psu.edu/viewdoc/download?doi=10.1.1.965.7393&rep=rep1&type=pdf, and "Speech and Language Processing" by Daniel Jurafsky and James H. Martin.

Identification of ambiguous words may be carried out by any suitable means. In some embodiments, a list of words in the first language which have more than one meaning in that language is compiled in advance, and for each word in the first segment of text it is determined whether or not the word is included in the pre-compiled list.

In the current example, the processor determines the meaning of the words "days", "paper", and "calendar", and identifies the word "numbered" as being ambiguous.

At step 208, the processor evaluates whether ambiguous words have been found in the first segment of text. If ambiguous words have been found, one such word is selected at step 210, and at step 212 the processor identifies in the second segment of text a word in the second language, which corresponds to the selected ambiguous word. At step 214, the processor evaluates whether the identified corresponding word is ambiguous in the second language, possibly using a pre-compiled list of ambiguous words of the second language.

In the present example, the selected (and only) ambiguous word is "numbered", which corresponds to the Hebrew word "ממוספרים". As discussed hereinabove, the two meanings of the word "numbered" in English translate into two different words in Hebrew, with "ממוספרים" meaning "marked by numbers" and "ספורים" meaning "limited in number". As such, and due to the fact that the Hebrew word "ממוספרים" has no meanings other than "marked by numbers", the Hebrew word corresponding to the ambiguous word "numbered", is non-ambiguous in the second segment of text.

If the corresponding word in the second language is unambiguous, as in the example above, the meaning of the corresponding word is taken as the correct meaning of the ambiguous word in the first language, at step 216, and the meaning of the ambiguous word is resolved. Returning to the example, the meaning of the Hebrew word "ממוספרים"—"marked by numbers"—is assigned to the English word "numbered" in the first segment of text.

Otherwise, if the corresponding word is ambiguous in the second language, at step 218 other disambiguation methodologies are used to resolve the meaning of the ambiguous word.

In some embodiments, in order to resolve the meaning of the ambiguous word at step 218, the disambiguation process of steps 212 to 218 may be repeated using a third segment of text in a third language, the third segment of text being a translation of the first and second segments of text into the third language.

Once the selected ambiguous word is resolved, the processor returns to step 208 to see whether any words are still ambiguous, and have not yet been resolved. If there are unresolved ambiguous words, the process returns to step 210, and a new ambiguous word is selected for processing.

If all the ambiguous words have been resolved, or if at step 208 it is determined that no ambiguous words were found, the entire content of the first segment of text is determined, and the processor outputs a message based on the determined content of the first segment of text at step 222. In the embodiment of FIG. 1A, the message is outputted to the set-top box 124b or to the media playing device 124a. In the embodiment of FIG. 1B, the message is outputted to the output destination 125b.

In some embodiments, such as when using device 100a of FIG. 1A and when the first segment of text comprises subtitles of video media content, the message may comprise a recommendation for content associated with the video media content or with the first segment of text. For example, the message may include a recommendation for additional video media content of a similar genre, or relating to similar topics.

In some embodiments, for example when using device 100b of FIG. 1B, the message may comprise a textual description of the determined content of the first segment of text. In some embodiments, information related to the determined content of the first segment of text may be obtained by the processor, and the message may include the obtained information. In some embodiments, the processor may translate the first segment of text into a third segment of text in a third language, based on the determined content of the first segment of text, and the message may include the third segment of text.

In some embodiments, the processor may output the message at step 222 by providing the message to a display device functionally associated with the processor to be visually displayed thereon. For example, in the embodiment of FIG. 1A, the message may be provided to the set-top box 124b or to the media playing device 124a for display on a screen associated with the media playing device. As another example, in the embodiment of FIG. 1B, the output destination 125b may be a display screen, and the message outputted by the processor may be displayed thereon.

In some embodiments, the processor may output the message at step 222 by providing the message to a non-transitory computer readable storage medium functionally associated with the processor to be stored therein. For example, in the embodiment of FIG. 1B, the output destination 125b may be a hard disk drive or other storage medium, and the message outputted by the processor may be stored therein.

Figure 3A:
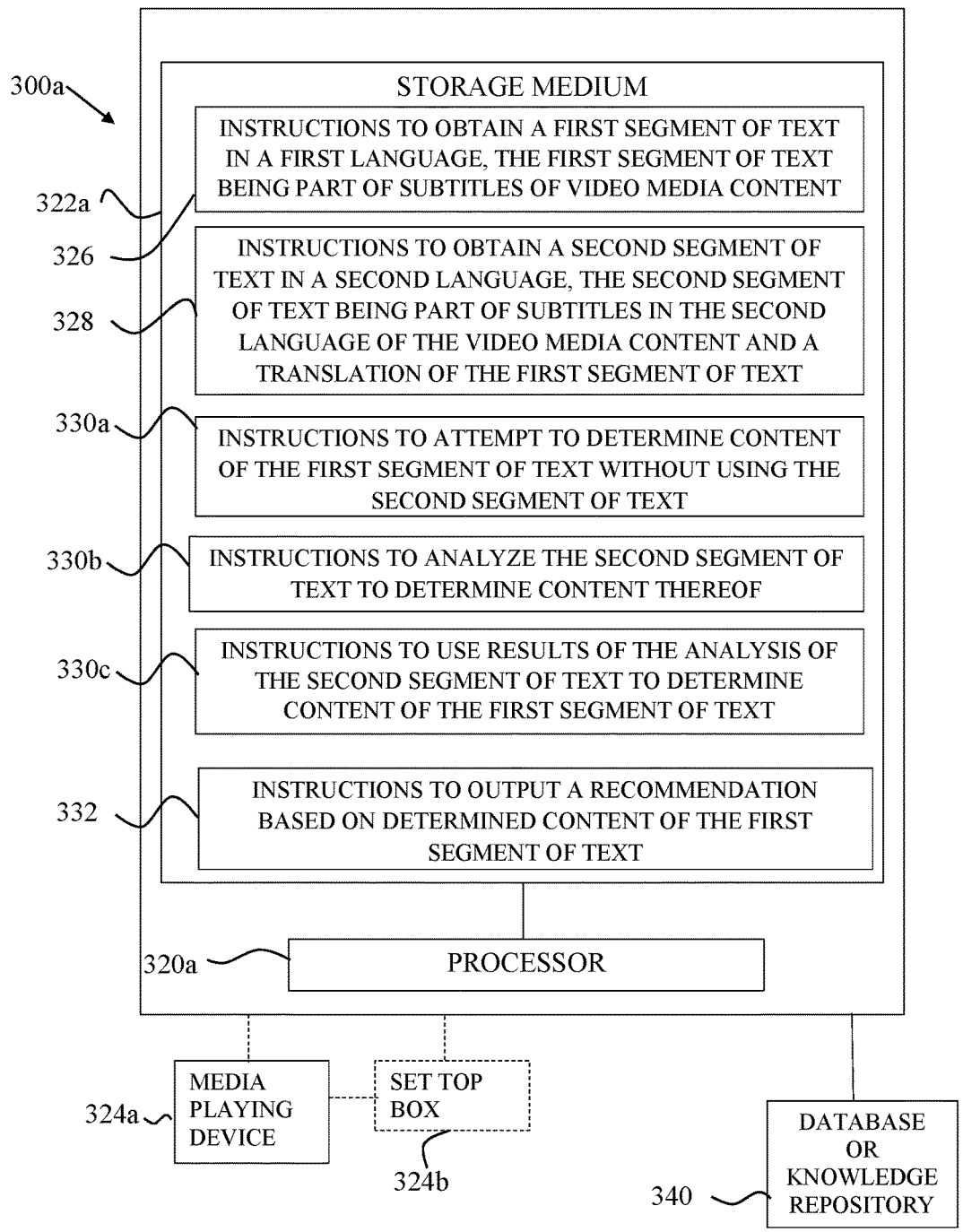
FIGS. 3A and 3B are schematic block diagrams of two embodiments of devices for determining the meaning of a segment of text, using a translation of the text into another language, according to a second embodiment of the teachings herein.
Figure 3B:
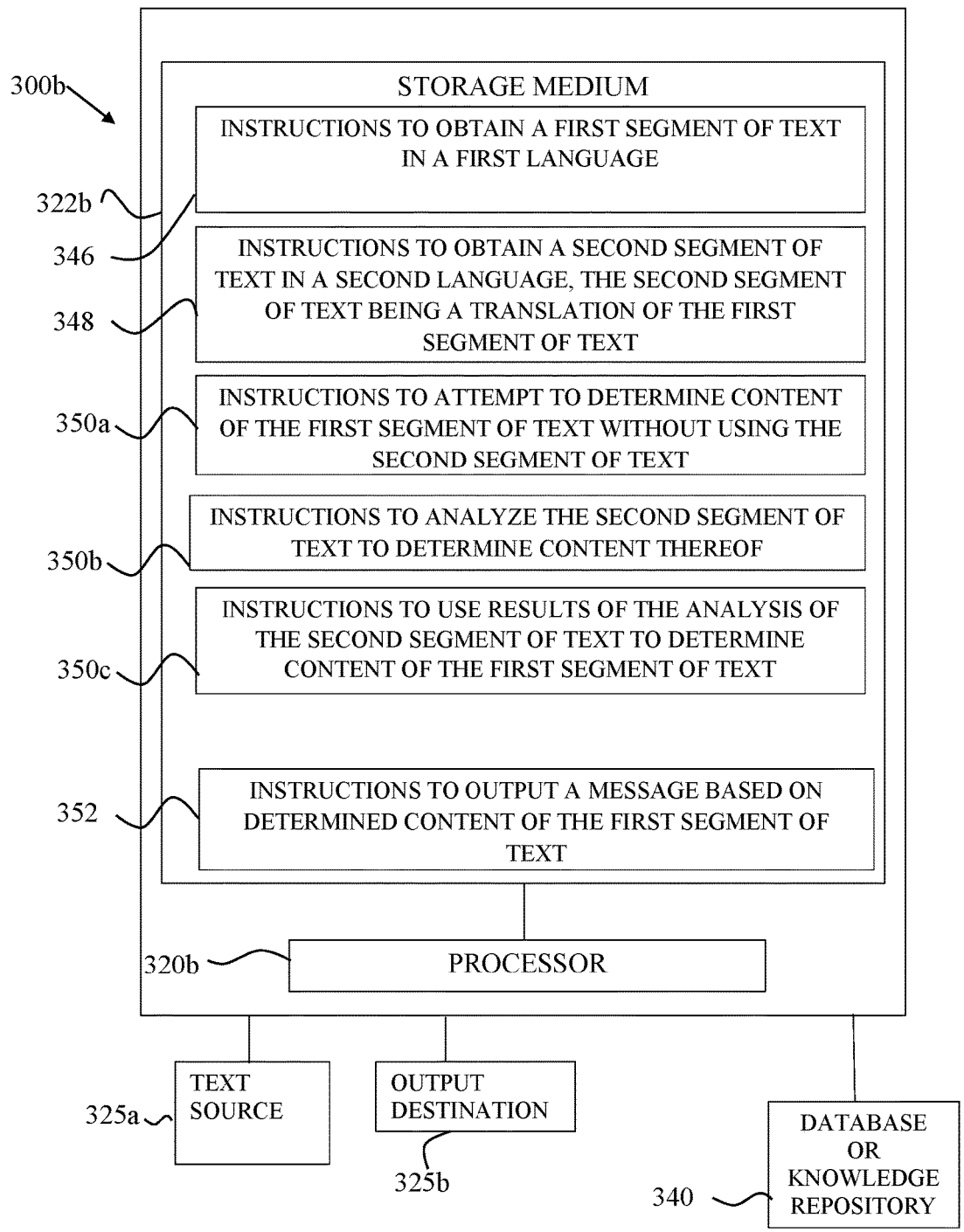

Reference is now made to FIGS. 3A and 3B, which are schematic block diagrams of two embodiments of devices for determining the meaning of a segment of text, using a translation of the text into another language, according to a second embodiment of the teachings herein.

As seen in FIG. 3A, a device 300a for determining the meaning of a segment of text includes a processor 320a and a storage medium 322a, which is typically a non-transitory computer readable storage medium. Device 300a further includes, or is associated with, a media playing device 324a and/or a set-top-box 324b, which may itself be associated with the media playing device 324a. As such, device 300a is associated with media playing device 324a either directly, or via set-top-box 324b.

The storage medium 322a includes instructions to be executed by the processor 320a, in order to carry out various steps of the method described herein, as described in further detail hereinbelow. Specifically, the storage medium includes at least the following instructions:

instructions 326 to obtain a first segment of text in a first language, the first segment of text being part of subtitles of video media content played by media playing device 324a;

instructions 328 to obtain a second segment of text in a second language, the second segment of text being part of subtitles in the second language of the same video media content played by media playing device 324a and being a translation of the first segment of text;

instructions to determine content of the first segment of text in accordance with a predefined analysis rule, while the media playing device is playing the video media content, where the rule is implemented by instructions including:

instructions 330a to attempt to determine content of the first segment of text by analyzing the first segment of text without using the second segment of text;

instructions to be carried out only if the content of the first segment of text was not determined using the instructions 330a, including:

instructions 330b to analyze the second segment of text to determine content thereof; and instructions 330c to use results of the analysis of the second segment of text to determine content of the first segment of text; and instructions 332 to output a recommendation based on the determined content of the first segment of text, the recommendation being for content associated with the video media content or with the first segment of text.

The instructions 330a to attempt to determined content of the first segment of text by analyzing the first segment of text may include instructions for implementing any suitable methodology for natural language processing and understanding of text. For example, the instructions 330a may include instructions for carrying out the methodologies disclosed in U.S. Pat. Nos. 4,931,935; 4,980,829; 5,056,021; 5,109,509; 5,424,947; 5,590,039; 5,761,631; 5,794,050; 5,878,386; 6,292,771; 6,505,157; 6,684,201; 6,952,666; 7,739,102; 8,463,593; 8,712,759; 2001/0024902; 2004/0078190; and 2005/0080613, as well as in http://anthology.aclweb.org/P/P91/P91-1017.pdf, http://citeseerx.ist.psu.edu/viewdoc/download?doi=10.1.1.965.7393&rep=rep1&type=pdf, and "Speech and Language Processing" by Daniel Jurafsky and James H. Martin. In some embodiments, the instructions 330a include instructions for accessing a database or knowledge repository 340, which may be functionally associated with processor 320a, for example via a communication system or a communication line.

Turning to FIG. 3B, it is seen that a device 300b thereof is substantially similar to device 300a of FIG. 3A, with slight differences as described herein. As such, the reference numerals of FIG. 3B correspond to those of FIG. 3A.

Device 300b includes a processor 320b substantially as described hereinabove with respect to FIG. 3A. The processor 320b of FIG. 3B is associated with a text source 325a, and with an output destination 325b.

In some embodiments, the text source 325a may be a media playing device or set top box as described hereinabove with reference to FIG. 3A. In other embodiments the text source may be a website, an electronic book, a local computer or any other suitable text source.

In some embodiments, the output destination 325b is a display screen, such as a display screen associated with a desktop computer, laptop computer, tablet computer, smartphone, or television. In some embodiments, the output destination 325b may be a computer storage, such a hard disk, a solid-state drive, a removable storage device, or the like.

Some of the instructions stored in the storage medium 322b are different from those stored in storage medium 322a. Specifically, the storage medium includes at least the following instructions:

instructions 346 to obtain a first segment of text in a first language;

instructions 348 to obtain a second segment of text in a second language, the second segment of text being a translation of the first segment of text;

instructions to determine content of the first segment of text in accordance with a predefined analysis rule, where the rule is implemented by instructions including:

instructions 350a to attempt to determine content of the first segment of text by analyzing the first segment of text without using the second segment of text;

instructions to be carried out only if the content of the first segment of text was not determined using the instructions 350a, including:

instructions 350b to analyze the second segment of text to determine content thereof; and instructions 350c to use results of the analysis of the second segment of text to determine content of the first segment of text; and instructions 352 to output a message based on the determined content of the first segment of text.

As discussed hereinabove with reference to FIG. 3A, the instructions 350a may include instructions for carrying out the methodologies disclosed in U.S. Pat. Nos. 4,931,935; 4,980,829; 5,056,021; 5,109,509; 5,424,947; 5,590,039; 5,761,631; 5,794,050; 5,878,386; 6,292,771; 6,505,157; 6,684,201; 6,952,666; 7,739,102; 8,463,593; 8,712,759; 2001/0024902; 2004/0078190; and 2005/0080613, as well as in http://anthology.aclweb.org/P/P91/P91-1017.pdf, http://citeseerx.ist.psu.edu/viewdoc/download?doi=10.1.1.965.7393&rep=rep1&type=pdf, and "Speech and Language Processing" by Daniel Jurafsky and James H. Martin. In some embodiments, the instructions 350a include instructions for accessing a database or knowledge repository 340, which may be functionally associated with processor 320b, for example via a communication system or a communication line.

Figure 4:
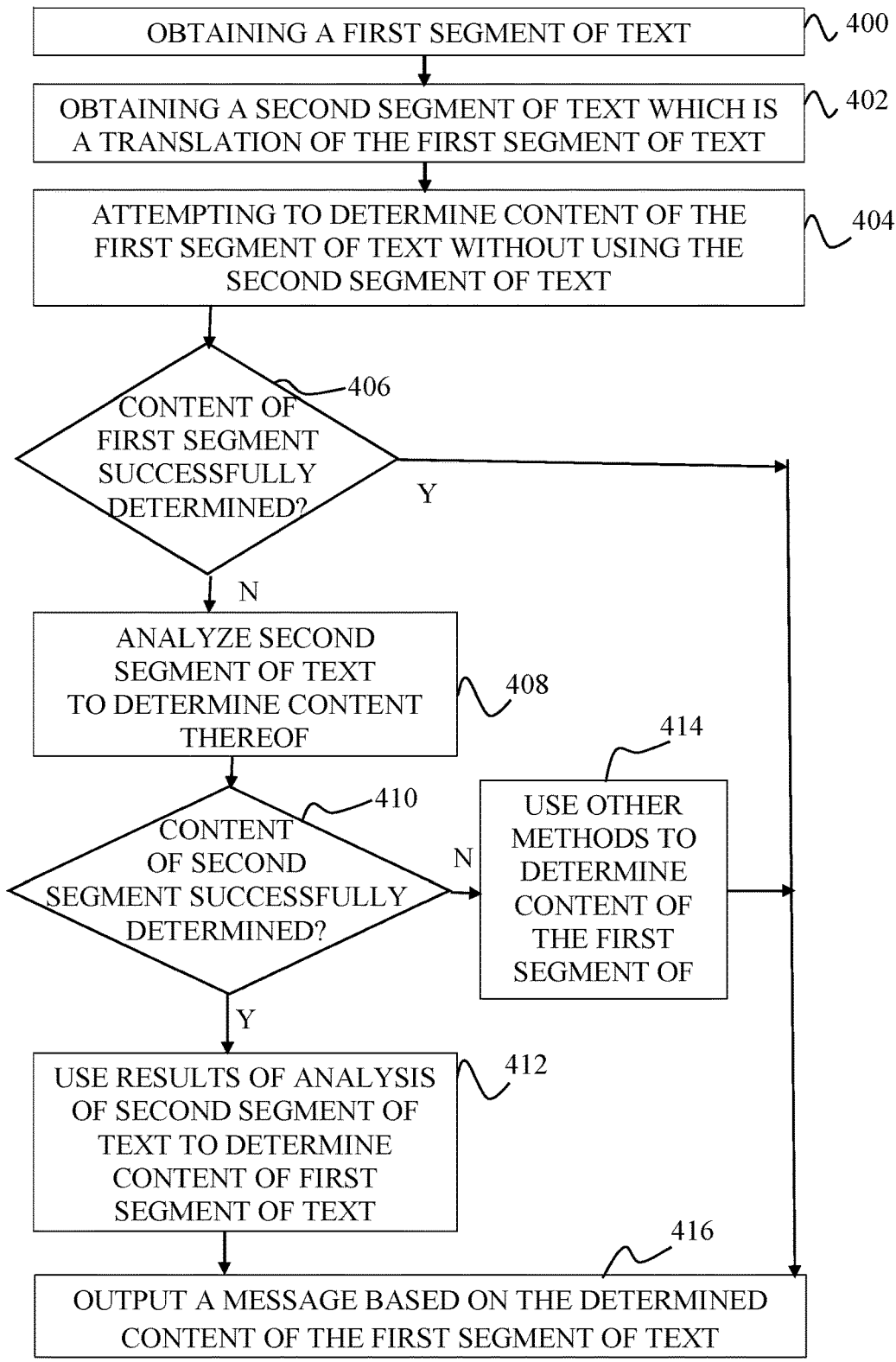
FIG. 4 is a flow chart of an embodiment of a method for determining the meaning of a segment of text, using a translation of the text into another language, according to another embodiment of the teachings herein, using the devices of FIGS. 3A and 3B.

Reference is now additionally made to FIG. 4, which is a flow chart of an embodiment of a method for determining the meaning of a segment of text, using a translation of the text into another language, according to another embodiment of the teachings herein, using the devices 300a and 300b of FIGS. 3A and 3B, respectively.

FIG. 4 is described herein with respect to another example, in which the meaning of the English sentence "The restaurant hosted a large party" is being determined. The word 'party' in English can be used to mean 'a group of people' or 'a celebration'. As such, the sentence can be interpreted as meaning "the restaurant hosted a large celebration" or as meaning "the restaurant hosted a large group of people". By contrast, in Hebrew, a party in the meaning of a group of people is 'קבוצה' and a party in the meaning of a celebration is 'מסיבה'. In the present example, the intended meaning is that relating to a large celebration. As seen in FIG. 4, initially the processor (320a or 320b) obtains a first segment of text in a first language, at step 400, and a second segment of text in a second language, at step 402. The second segment of text is a translation of the first segment of text. In the present example, the first segment of text is the English sentence "The restaurant hosted a large party", and the second segment of text is the corresponding Hebrew sentence "המסעדה אירחה מס יבה גדולה".

In some embodiments, such as when using device 300a of FIG. 3A, the first and second segments of text comprise part of subtitles of video media content played by media playing device 324a. In some such embodiments, the first and second segments of text are obtained from the media playing device 324a or from the set-top box 324b.

In other embodiments, such as when using device 300b of FIG. 3B, the first and second segments of text may be any suitable segments of text, and may include segments taken from a website, a book, a newspaper, a magazine, or from any other suitable source of text. In some such embodiments, the first and second segments of text are obtained from the text source 325a, either directly or via a communication line or a communication network.

The processor (320a or 320b) proceeds to analyze the text in accordance with an analysis rule, as described hereinbelow. It is a particular feature of some embodiments of the teachings herein that analysis of the text is carried out in real-time. For example, in embodiments in which the segment of text comprises subtitles of video media content, the analysis of the text is carried out as the video media content is being played on media playing device 324a. In other embodiments, the analysis of the text may be carried out as the segment of text is being obtained, for example as an electronic book is being read.

At step 404, the processor (420a or 420b) attempts to determine the content of the first segment of text, by analyzing the first segment of text without using the second segment of text. Analysis of the first segment of text may be carried out using any suitable methodology. For example, analysis of the first segment of text may be carried out using methodologies disclosed in U.S. Pat. Nos. 4,931,935; 4,980,829; 5,056,021; 5,109,509; 5,424,947; 5,590,039; 5,761,631; 5,794,050; 5,878,386; 6,292,771; 6,505,157; 6,684,201; 6,952,666; 7,739,102; 8,463,593; 8,712,759; 2001/0024902; 2004/0078190; and 2005/0080613, as well as in http://anthology.aclweb.org/P/P91/P91-1017.pdf, http://citeseerx.ist.psu.edu/viewdoc/download?doi=10.1.1.965.7393&rep=rep1&type=pdf, and "Speech and Language Processing" by Daniel Jurafsky and James H. Martin.

In the present example, the processor attempts to determine the meaning of the English sentence 'The restaurant hosted a large party'.

At step 406, the processor evaluates whether the content of the first segment of text was successfully determined at step 404. The analysis is considered successful if every word in the first segment of text is resolved, and there is no ambiguity as to the content of the first segment of text. Such ambiguity may arise from the first segment of text including ambiguous words, which have more than one meaning in the first language. In the present example, the content of the sentence is not successfully determined, as it is unclear whether the meaning of the sentence is that the restaurant hosted a large group of people or that the restaurant hosted a large celebration.

If the analysis is determined to be unsuccessful, at step 408 the second segment of text is analyzed to determine content of the second segment of text, substantially as described hereinabove at step 404. At step 410, the processor evaluates whether the content of the second segment of text was successfully determined at step 408. In the present example, the corresponding Hebrew sentence, 'מסיבה גדולה המסעדה אירחה' is unambiguous and the meaning thereof is clearly that the restaurant hosted a large celebration.

If the content of the second segment of text was successfully determined, results of the analysis of the second segment of text are used to determine the content of the first segment of text, at step 412. In the present example, it is understood that the sentence 'The restaurant hosted a large party' means that the restaurant hosted a large celebration, or that a large party occurred at the restaurant.

Otherwise, if the content of the second segment of text was not successfully determined, at step 414 other methodologies are used to determine the meaning of the first segment of text.

In some embodiments, in order to determine the meaning of the first segment of text at step 414, steps 408 to 412 may be repeated using a third segment of text in a third language, the third segment of text being a translation of the first and second segments of text into the third language.

Once the content of the first segment of text is successfully determined, either at step 404 or following steps 412 or 414, the processor outputs a message based on the determined content of the first segment of text at step 416. In the embodiment of FIG. 3A, the message is outputted to the set-top box 324b or to the media playing device 324a. In the embodiment of FIG. 3B, the message is outputted to the output destination 325b.

In some embodiments, such as when using device 300a of FIG. 3A and when the first segment of text comprises subtitles of video media content, the message may comprise a recommendation for content associated with the video media content or with the first segment of text. For example, the message may include a recommendation for additional video media content of a similar genre, or relating to similar topics.

In some embodiments, for example when using device 300b of FIG. 3B, the message may comprise a textual description of the determined content of the first segment of text. In some embodiments, information related to the determined content of the first segment of text may be obtained by the processor, and the message may include the obtained information. In some embodiments, the processor may translate the first segment of text into a third segment of text in a third language, based on the determined content of the first segment of text, and the message may include the third segment of text.

In some embodiments, the processor may output the message at step 416 by providing the message to a display device functionally associated with the processor to be visually displayed thereon. For example, in the embodiment of FIG. 3A, the message may be provided to the set-top box 324b or to the media playing device 324a for display on a screen associated with the media playing device. As another example, in the embodiment of FIG. 3B, the output destination 325b may be a display screen, and the message outputted by the processor may be displayed thereon.

In some embodiments, the processor may output the message at step 416 by providing the message to a non-transitory computer readable storage medium functionally associated with the processor to be stored therein. For example, in the embodiment of FIG. 3B, the output destination 325b may be a hard-disk drive of a server or other storage medium, and the message outputted by the processor may be stored therein.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. A method for automatically determining content of a text associated with video media content and for generating an output based on the content, the method comprising:
  a) obtaining, by a processor associated with a media playing device or with a set top box feeding said media playing device, a first segment of text in a first language, said first segment of text being part of subtitles in said first language of video media content played by said media playing device, said subtitles in said first language being generated prior to initiating playing of said video media content by said media playing device;
  b) obtaining, by said processor, a second segment of text in a second language, said second segment of text being part of subtitles in said second language of said video media content played by said media playing device, said second segment of text being a translation of said first segment of text, said subtitles in said second language being generated prior to initiating playing of said video media content by said media playing device;
  c) using said processor, automatically determining content of said first segment of text, in accordance with a predefined analysis rule, said automatically determining of said content of said first segment of text being done while said media playing device is playing said video media content, said rule including:
    i) initially automatically analyzing said first segment of text without using said second segment of text, thereby attempting to unambiguously determine said content of said first segment of text;
    ii) in response to determining, during said analyzing of said first segment of text, that said first segment of text contains no ambiguous words which have multiple meanings in said first language, automatically and unambiguously determining said content of said first segment of text;
    iii) in response to identifying, during said analyzing of said first segment of text, one or more ambiguous words in said first segment of text which have multiple meanings in said first language, for at least one identified ambiguous word having multiple meanings in said first language:
      A) automatically identifying a corresponding word of said second language that appears in said second segment of text and is a translation of said identified ambiguous word;
      B) automatically determining whether said corresponding word has an unambiguous meaning in said second language; and
      C) in response to determining that said corresponding word has an unambiguous meaning in said second language, automatically assigning said unambiguous meaning of said corresponding word to said identified ambiguous word, and automatically and unambiguously determining said content of said first segment of text based on said assigned unambiguous meaning;
  d) generating a recommendation based on said determined content of said first segment of text, said recommendation being for content associated with said video media content or with said first segment of text; and
  e) outputting, by said processor, said recommendation.

2. The method of claim 1, wherein said outputting said recommendation comprises displaying said recommendation visually on a display associated with said media playing device.

3. The method of claim 1, further comprising, subsequent to said automatically determining whether said corresponding word has an unambiguous meaning in said second language and in response to determining that said corresponding word in said second language is an ambiguous word having multiple meanings in said second language:
  automatically identifying a corresponding word of a third language that appears in a third segment of text and is a translation of said identified ambiguous word of said first language;
  automatically determining whether said corresponding word of said third language has an unambiguous meaning in said third language; and
  in response to determining that said corresponding word of said third language has an unambiguous meaning in said third language, automatically assigning said unambiguous meaning of said corresponding word of said third language to said identified ambiguous word of said first language;
  wherein (i) said third segment of text is part of subtitles in said third language of said video media content played by said media playing device, (ii) said third segment of text is a translation of said first segment of text, and (iii) said subtitles in said third language are generated prior to initiating playing of said video media content by said media playing device.

4. The method of claim 1, wherein said identifying one or more ambiguous words comprises looking up words of said first segment of text in a pre-compiled list of ambiguous words for said first language.

5. A method for automatically determining content of a text and for generating an output based on the content, the method comprising:
  a) obtaining, by a processor associated with a device operable to analyze text for determining content of the text, a first segment of text in a first language;
  b) obtaining, by said processor, a second segment of text in a second language, said second segment of text being a translation of said first segment of text;

c) subsequent to said obtaining said first segment of text and said second segment of text and using said processor, automatically determining content of said first segment of text, in accordance with a predefined analysis rule, said rule including:
   i) initially automatically analyzing said first segment of text without using said second segment of text, thereby attempting to unambiguously determine said content of said first segment of text;
   ii) in response to determining, during said analyzing of said first segment of text, that said first segment of text contains no ambiguous words which have multiple meanings in said first language, unambiguously and automatically determining said content of said first segment of text;
   iii) in response to identifying, during said analyzing of said first segment of text, one or more ambiguous words in said first segment of text which have multiple meanings in said first language, for at least one identified ambiguous word having multiple meanings in said first language:
      A) automatically identifying a corresponding word of said second language that appears in said second segment of text and is a translation of said identified ambiguous word;
      B) automatically determining whether said corresponding word has an unambiguous meaning in said second language; and
      C) in response to determining that said corresponding word has an unambiguous meaning in said second language, automatically assigning said unambiguous meaning of said corresponding word to said identified ambiguous word, and automatically and unambiguously determining said content of said first segment of text based on said assigned unambiguous meaning;
d) generating a message based on said determined content of said first segment of text; and
e) outputting, by said processor, said message.

6. The method of claim 5, wherein said generating said message comprises obtaining information that is related to said content of said first segment of text and defining said information to be said message.

7. The method of claim 5, wherein said generating said message comprises generating a translation of said first segment of text into a third segment of text in a third language, and defining said third segment of text to be said message.

8. The method of claim 5, wherein said first segment of text and said second segment of text are obtained from subtitles of video media content while said video media content is being played by a media playing device, and wherein said generating said message comprises generating a recommendation for content associated with said video media content or with said first segment of text, and defining said recommendation to be said message.

9. The method of claim 5, wherein said outputting said message comprises displaying said message visually on a display device functionally associated with said processor.

10. The method of claim 5, wherein said outputting said message comprises outputting said message to a non-transitory computer readable storage medium functionally associated with said processor.

11. The method of claim 5, further comprising, subsequent to said automatically determining whether said corresponding word has an unambiguous meaning in said second language and in response to determining that said corresponding word in said second language is an ambiguous word having multiple meanings in said second language:
   automatically identifying a corresponding word of a third language that appears in a third segment of text and is a translation of said identified ambiguous word of said first language;
   automatically determining whether said corresponding word of said third language has an unambiguous meaning in said third language; and
   in response to determining that said corresponding word of said third language has an unambiguous meaning in said third language, automatically assigning said unambiguous meaning of said corresponding word of said third language to said identified ambiguous word of said first language,
   wherein said third segment of text is a translation of said first segment of text that is generated prior to the analyzing of said first segment of text.

12. The method of claim 5, wherein said identifying one or more ambiguous words comprises looking up words of said first segment of text in a pre-compiled list of ambiguous words for said first language.

13. A method for automatically determining true content of a text associated with video media content and for generating an output based on the true content, the method comprising:
   a) obtaining, by a processor associated with a media playing device or with a set top box feeding said media playing device, a first segment of text in a first language, said first segment of text being part of subtitles in said first language of video media content played by said media playing device, said subtitles in said first language being generated prior to initiating playing of said video media content by said media playing device;
   b) obtaining, by said processor, a second segment of text in a second language, said second segment of text being part of subtitles in said second language of said video media content played by said media playing device, said second segment of text being a translation of said first segment of text, said subtitles in said second language being generated prior to initiating playing of said video media content by said media playing device;
   c) using said processor, automatically determining true content of said first segment of text, in accordance with a predefined analysis rule, said automatically determining of said true content of said first segment of text being done while said media playing device is playing said video media content, said rule including:
      i) initially automatically analyzing said first segment of text without using said second segment of text, thereby attempting to unambiguously determine content of said first segment of text;
      ii) in response to said analyzing of said first segment of text succeeding to unambiguously determine said content of said first segment of text without using said second segment of text, accepting said determined content to be said true content of said first segment of text;
      iii) in response to said analyzing of said first segment of text failing to unambiguously determine said content of said first segment of text:
         A) automatically analyzing said second segment of text for determining content of said second segment of text; and
         B) automatically using results of said analyzing of said second segment of text to determine said true content of said first segment of text;

d) generating a recommendation based on said true content of said first segment of text, said recommendation being for content associated with said video media content or with said first segment of text; and e) outputting, by said processor, said recommendation.

14. The method of claim 13, wherein said outputting said recommendation comprises displaying said recommendation visually on a display associated with said media playing device.

15. A method for automatically determining true content of a text and for generating an output based on the true content, the method comprising:
   a) obtaining, by a processor associated with a device operable to analyze text for determining content of the text, a first segment of text in a first language;
   b) obtaining, by said processor, a second segment of text in a second language, said second segment of text being a translation of said first segment of text;
   c) subsequent to said obtaining said first segment of text and said second segment of text and using said processor, automatically determining true content of said first segment of text, in accordance with a predefined analysis rule, said rule including:
      i) initially analyzing said first segment of text without using said second segment of text, thereby attempting to unambiguously determine content of said first segment of text;
      ii) in response to said analyzing of said first segment of text succeeding to unambiguously determine said content of said first segment of text without using said second segment of text, accepting said determined content to be said true content of said first segment of text; and
      iii) in response to said analyzing of said first segment of text failing to unambiguously determine said content of said first segment of text:
         A) automatically analyzing said second segment of text for determining content of said second segment of text; and
         B) automatically using results of said analyzing of said second segment of text to determine said true content of said first segment of text;
   d) generating a message based on said determined true content of said first segment of text; and
   e) outputting, by said processor, said message.

16. The method of claim 15, wherein said generating said message comprises obtaining information that is related to said true content of said first segment of text and defining said information to be said message.

17. The method of claim 15, wherein said generating said message comprises generating a translation of said first segment of text into a third segment of text in a third language, and defining said third segment of text to be said message.

18. The method of claim 15, wherein said first segment of text and said second segment of text are obtained from subtitles of video media content while said video media content is being played by a media playing device, and wherein said generating said message comprises generating a recommendation for content associated with said video media content or with said first segment of text, and defining said recommendation to be said message.

19. The method of claim 15, wherein said outputting said message comprises displaying said message visually on a display device functionally associated with said processor.

20. The method of claim 15, wherein said outputting said message comprises outputting said message to a non-transitory computer readable storage medium functionally associated with said processor.

* * * * *